Aug. 4, 1953     E. F. MEKELBURG     2,648,032
CONTROL CENTER
Filed Sept. 21, 1950     3 Sheets-Sheet 1
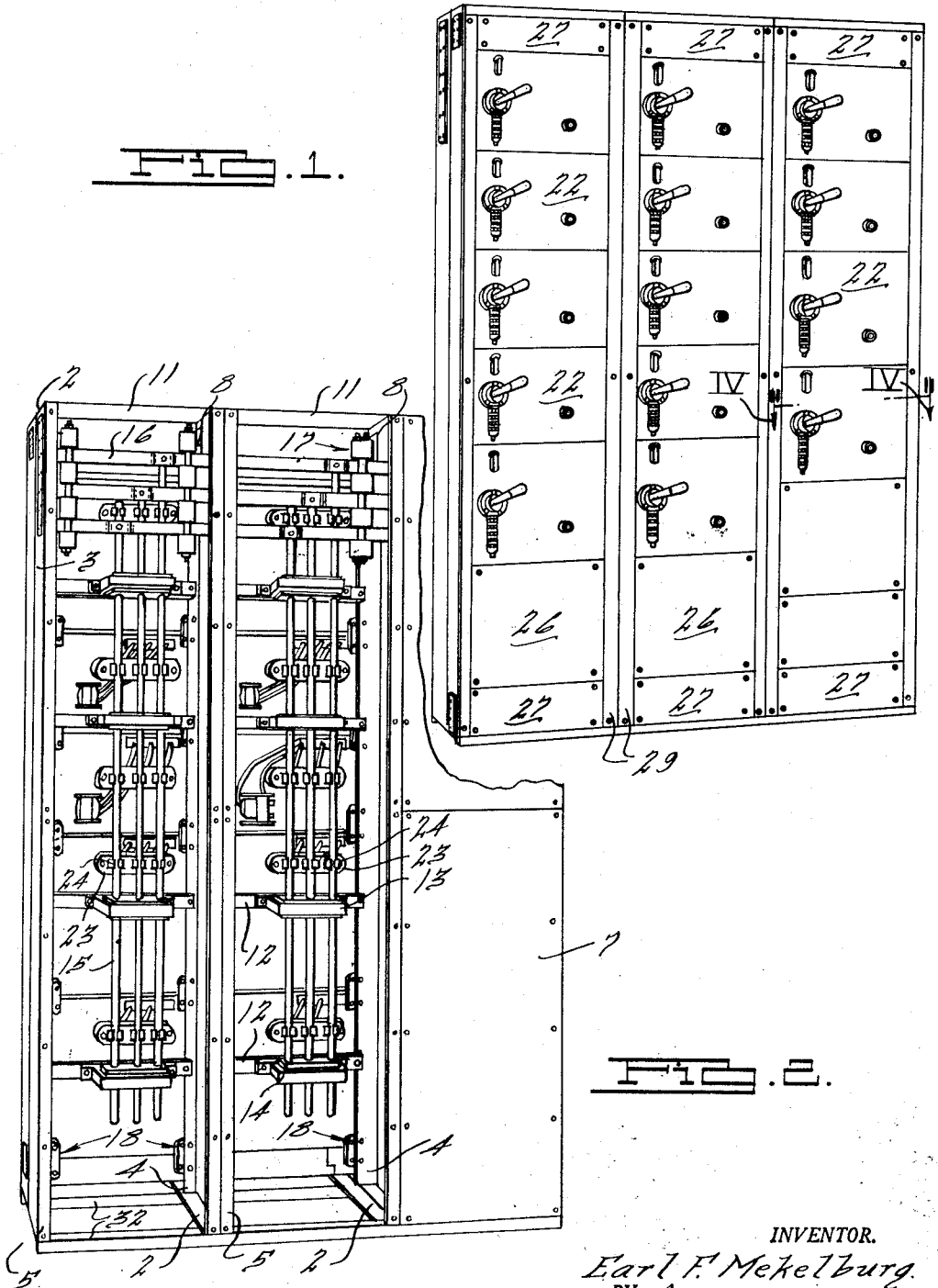
INVENTOR.
Earl F. Mekelburg
BY
ATTORNEY.

Aug. 4, 1953 E. F. MEKELBURG 2,648,032
CONTROL CENTER
Filed Sept. 21, 1950 3 Sheets-Sheet 2
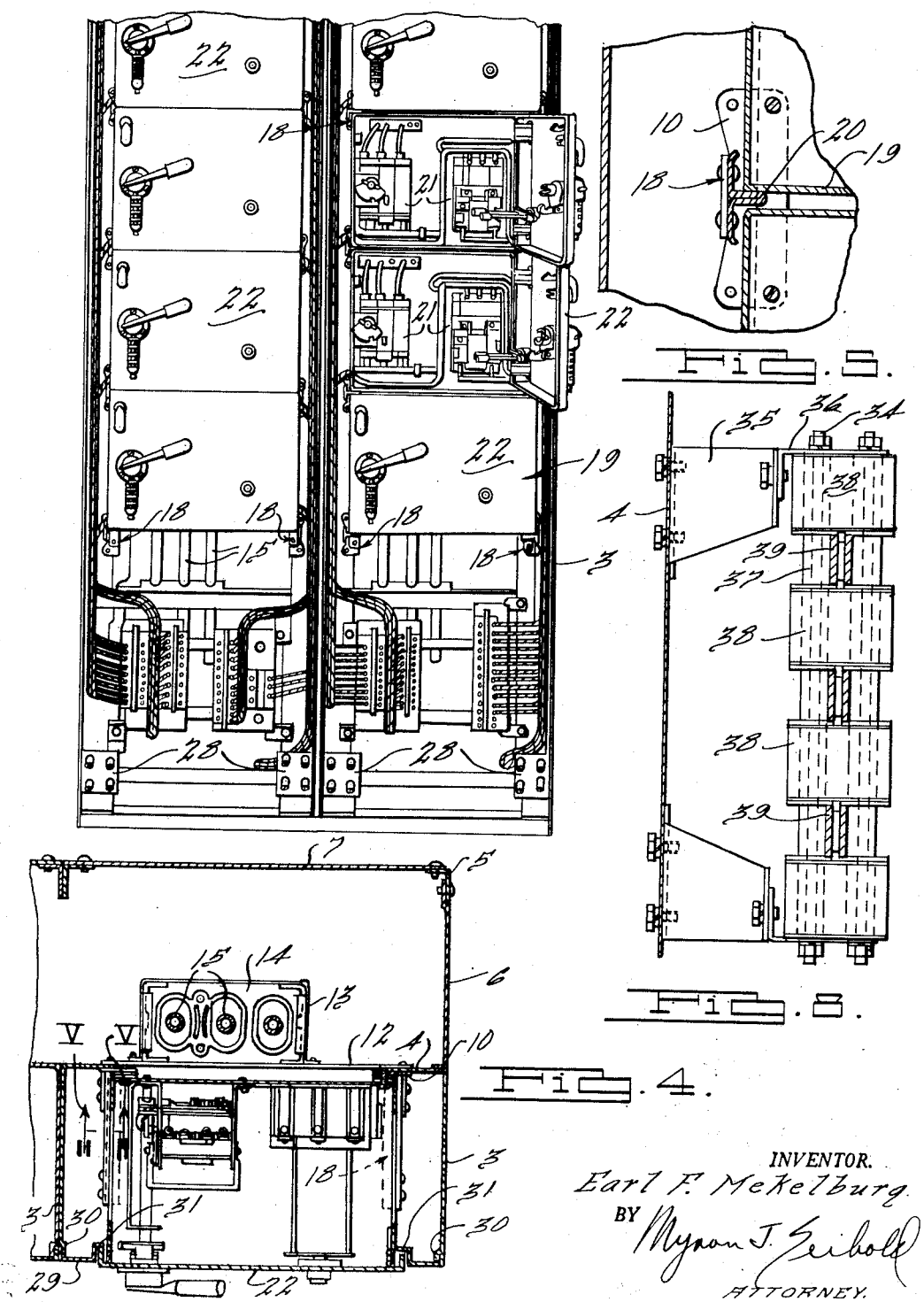
INVENTOR.
Earl F. Mekelburg
BY
ATTORNEY.

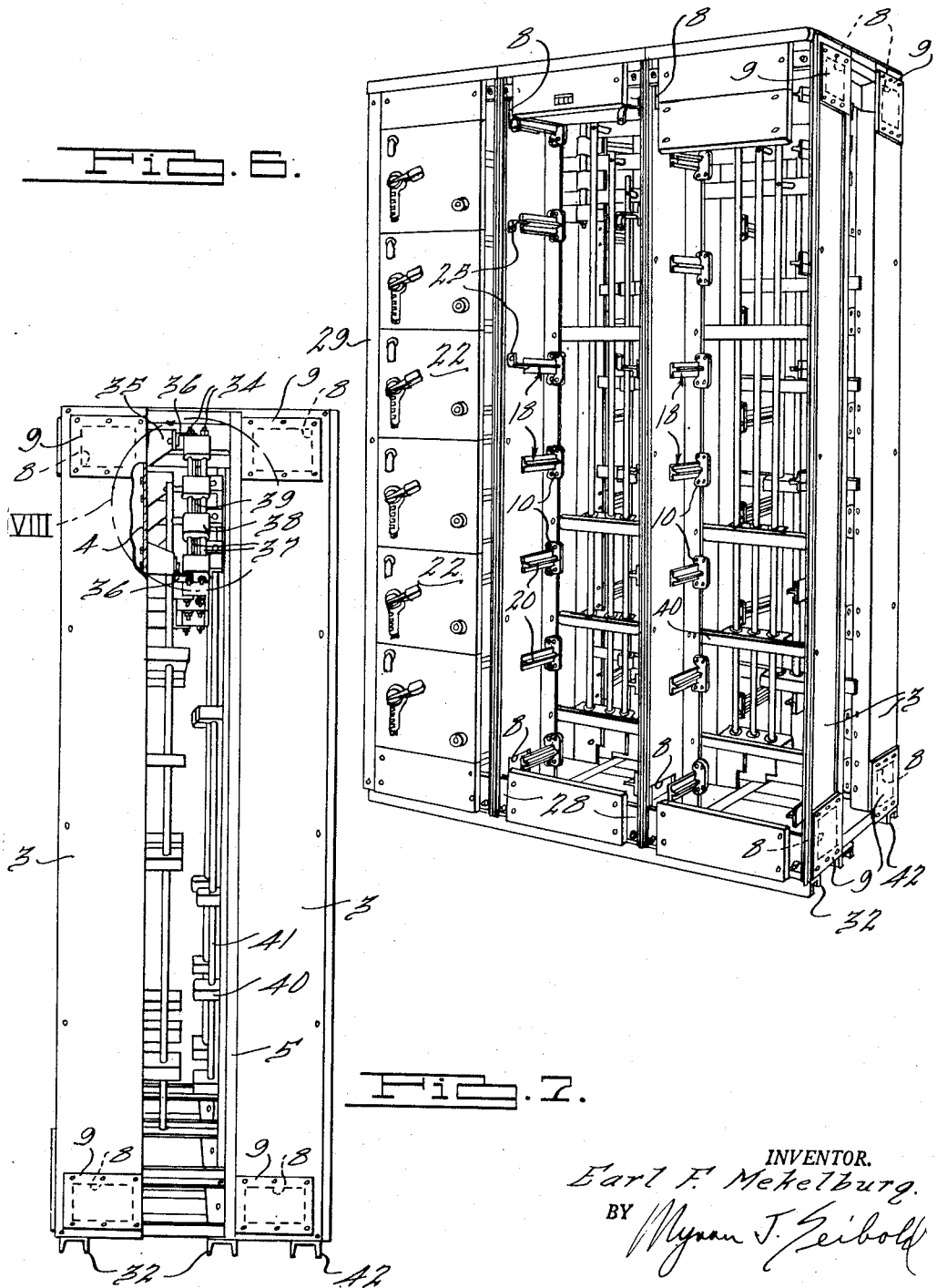

Patented Aug. 4, 1953

2,648,032

UNITED STATES PATENT OFFICE 2,648,032

CONTROL CENTER

Earl F. Mekelburg, Wauwatosa, Wis., assignor to Square D Company, Detroit, Mich., a corporation of Michigan Application September 21, 1950, Serial No. 186,089

14 Claims. (Cl. 317—117)

1

This invention relates to supporting and enclosing means for electric circuit controlling instrumentalities.

In modern industrial plants, in which a plurality of electrical devices for the protection and control of electrical circuits are required, it has become increasingly necessary that these circuit controlling instrumentalities be mounted and arranged in a readily accessible position, yet be so disposed as to minimize the danger inherent in electrical circuits. It is obviously necessary that this disposition be effected with, however, a minimum of space, and that the addition of other such instrumentalities to the group already in operation, as the expansion of the electrical requirements in the particular plant occurs, may be readily made. It is, of course, further required that the operating efficiency of the instrumentalities should be maintained at its highest level, and that the maintenance which these instrumentalities may require may be effected with ease. It is further of value that the arrangement of the devices be such as to have a pleasing appearance.

It is, therefore, one object of the present invention to provide a structure for mounting and enclosing electrical instrumentalities both simple and inexpensive to construct, and which provides a maximum of safety for the operators.

Another object of the present invention is a structure in accordance with the preceding object in which the space required is minimized.

A further object is the provision of a device in accordance with the preceding objects in which additional units may be added as demand requires with a minimum of effort.

Another object is the provision of a device in which the instrumentalities are mounted in enclosing boxes which may be slid into position, the energization of the instrumentality being effected by cooperation between bus bars and contact jaws.

Another object is the provision of a device in accordance with preceding objects in which adequate wiring space is provided, access to the wiring being readily available without the removal of the circuit controlling instrumentalities from the supporting structure.

Other objects and features of the invention will be readily apparent to those skilled in the art from the specification and appended drawing illustrating certain preferred embodiments in which:

Figure 1 is a front perspective view of the device of the present invention.

2

Figure 2 is a rear perspective view with the rear cover plates of two of the vertical sections removed.

Figure 3 is a front elevational view of the device of the present invention showing the device with the trim removed and circuit wiring exposed, and illustrating the position of circuit controlling instrumentalities within the enclosing boxes.

Figure 4 is a view along the line IV—IV of Figure 1.

Figure 5 is a view along the line V—V of Figure 4.

Figure 6 is a view of a modification of the device of the present invention shown with some of the trim removed, the unit being shown in back to back relation.

Figure 7 is a side view of the device of Figure 6.

Referring first to Figures 1–5 inclusive, applicant's invention therein illustrated is embodied in vertical sections enclosing a plurality of individual protective and control units. The sections are shown as assembled in side by side relation into a control group usually referred to as a control center. Each of the sections is comprised of a pair of partial sheet metal side walls 3 having inwardly directed rear flanges 4. To the top and bottom of the side walls 3 are welded or bolted angles 2 extending rearwardly of the flanges 4 and having vertical angles 5 welded or otherwise connected to their rearward ends in spaced relation to the flanges 4. In a single section, the spaces between the flanges 4 and angles 5 are closed by readily removable plates 6 suitably bolted to the flanges and angles. In the case of a group of sections assembled into a control center, only the side at the ends of the group will be provided with the closing plate 6 and the sides between juxtaposed sections may remain open. The backs of the sections are closed by removable plates 7 bolted to the angles 5. Near the top and bottom of the side walls 3 there are provided wiring apertures 8 closed at the opposite ends by plates 9. These appear more clearly in the modifications of Figures 6 and 7. The tops of the sections are closed by removable top plates 11 bolted to the top angle 2.

Within each vertical section, and rigidly mounted between the flanges 4 on the back faces thereof, are a plurality of spaced support bars 12 to which are fastened, as by studs, generally U-shaped brackets 13 which rigidly support insulating blocks 14 of porcelain or other suitable insulating material. Extending through spaced apertures in each insulating block 14 are three spaced bus bars 15 which are electrically and mechanically connected to suitable horizontally extending supply busses 16. The supply busses 16 are supported by suitable insulators 17 which are themselves mounted by brackets to the flanges 4. The particular mounting of the insulators 17 and busses 16 will be subsequently more fully described.

Upon the front faces of flanges 4 are mounted a plurality of spaced brackets 18, the spacing between the forwardly extending portions of brackets 18 being such as to exactly accommodate the height of an enclosing box 19 for circuit controlling instrumentalities 21. It is obvious that brackets 18 may be disposed so as to accommodate an enclosing box of any height. It should be noted that, as shown in Figure 4, the section is so constructed and arranged that there is substantial wiring space between any bracket 18 and the adjacent side wall 3, and that the lowermost and uppermost brackets 18 are spaced from the bottom and top of the device, respectively, so that adequate wiring space is provided at both the top and bottom of each vertical section, this space in juxtaposed sections being connected by apertures 8 as previously described.

These brackets 18 are shown in plan in Figure 4, and in detail transverse section in Figure 5, and in perspective in Figure 6. They are composed of back plates 10 bolted to the flanges 4, and having riveted thereto forwardly extending T-shaped guides 20 upon which the control units are slid into position.

The individual control units 19 are comprised of at least partial enclosing boxes, preferably having large openings in the side for wiring access. Upon the interior surface of the back wall of the enclosures are mounted suitable protective and/or control devices indicated at 21. At the front, upon the side walls of the enclosure is hinged a pan shaped door 22, providing access to the interior of the unit, having inwardly turned flanges as shown in Figures 3 and 4 which overlap the front edges of the walls of the unit enclosure.

Upon the rear face of the back wall of the unit enclosure, is mounted an insulating block 23 which carries a plurality of conducting contact jaws 24 positioned to engage the bus bars 15 when the unit 19 is in mounted position. Flexible electric conductors extend from the jaws 24 into the interior of the units as illustrated in Figure 2, these conductors being connected to the circuit protecting or controlling instrumentalities within the units. The units 19 are mounted within the vertical section by sliding them along the guides 20 of brackets 18. In their rearmost position, the units are rigidly supported by means of anchor bolts extending through the rear wall of the unit enclosures, and threaded into holes in the back plates 10 of brackets 18, these holes being shown in detail in Figure 5.

The particular operating and latching mechanism of the control units 19, as illustrated in Figure 3, is described and particularly claimed in applicant's copending application, Serial No. 185,699, filed September 20, 1950, for Operating Means for Enclosed Electric Circuit Controlling Devices.

When space within any particular vertical section is not to be utilized for the reception of the control units illustrated, as, for example, before the requirements of the user demand such use, there are affixed to the front portions of the brackets 18 extensions 25 shown in Figure 6, which provide mounting means for trim plates 26 which completely close the space normally occupied by the control unit and which give a uniform and neat appearance to the control center. Upper and lower trim plates 27 are provided in each vertical section, being mounted by suitable brackets 28, and being removable to facilitate access to the interior of the device. As shown in Figure 3, space not used for a control unit may be used instead for wiring connectors.

As previously indicated, and as may be seen by inspection of Figure 3, there is substantial space between the side of any control unit 19 and the adjacent side wall 3. As illustrated therein, circuit wiring extending to both power and control circuits is run within this space, the power and control circuit wiring preferably being separated, with the power wiring being on one side of the enclosure, and the control wiring on the other. Vertical trim strips 29 which are attached by suitable screws to brackets 28 at both the bottom and top of the device and by an intermediate clamp are provided to cover this wiring space, it being readily apparent that access may be had to this circuit wiring merely by removing the trim strips 29 without the removal of the enclosing boxes 19.

The front edges of the side walls 3 are provided with narrow, offset portions 30 which are received within an inwardly projected flange on the trim strip 29, so that the flange at the outer edge of the trim strip and the side wall form a substantially continuous surface. The inner edges of trim strips 29 have inwardly offset flanges 31 parallel to the front face of the section, and the rearwardly extending side edges of the door 22 engage with the flanges 31 to complete the enclosure of the area between side walls 3, the flanges 4, the back wall of the control unit 19 and the trim strips 29.

With the construction above described, it will be seen that the control unit 19 is supported in position by its mounting on the plates 10 mounted on the flanges 4. This places the support of the unit adjacent its center of mass, and provides for a strong and rigid support with little tendency for bending under shock, such as might occur incident to transportation.

When the individual vertical sections are assembled in side by side relation to form a control center, the individual sections are mounted upon a pair of spaced, inverted channels 32, and are secured thereto by bolting through the lower angles 2. The sections are also joined directly together by bolting the adjacent side walls 3. In this arrangement, the apertures 8 in the side walls will meet to form a continuous opening through the sections for circuit wires.

The spaces between flanges 4 and angles 5 will also be aligned for free access through the sections, and in the upper portion of this space the horizontal bus bars 16 will be placed in supported relation upon insulators 17 after the sections are assembled.

Referring to Figures 6 and 7, there is shown a modification of the device of the present invention in which back-to-back mounting of control units 19 is employed.

Figure 7 is a side elevational view looking toward the remote side of Figure 6. In this construction, the side wall 3 at the left of Figure 7 and the angle 5 and the elements therebetween, except for the insulators 40 and busses 41, are substantially the same as those of Figures 1 through 5, and alone would constitute a control center having units mounted on the front only thereof.

To this construction has been added a back grouping of vertical sections including only the side walls 3 and the elements mounted thereon, including the insulators 40 and busses 41 which are mounted on bars 12 in the same manner as are the insulators 14 and busses 15 of the single construction. In this arrangement, the back partial sections are mounted upon an inverted channel 42, and the flanges 4 of these sections are bolted directly to the angles 5 in place of the back plates 7.

As will be seen from Figures 7 and 8, to the inwardly turned flanges 4 of one set of side walls 3 there are rigidly fastened rearwardly extending brackets 35, two vertically spaced brackets 35 being mounted to each flange 4. To the end of each bracket 35 is rigidly mounted an L-shaped strap 36, between each pair of which is disposed a supporting and insulating assembly for the bus bars. This assembly is carried by a pair of rods 34 received within insulating tubes 37 upon which are slidably mounted spaced insulators 38 between which are disposed the bus bars 39. The rods 34 extend through the straps 36, and the insulator and bus bar assembly is suitably clamped together to the straps 36 by nuts at the opposite ends of the rods.

As shown in Figure 8, a set of three pair of bus bars 39 are shown between four spaced insulators 38. It is understood that by spacing brackets 35 further apart, four or any greater number of bus bars may be used. A change in bracket spacing may be used to accommodate bus bars of different widths to provide varied current carrying cross section as the demand arises. One of the bus bars 39 of each pair may be omitted when the current carrying capacity of one bus bar is sufficient.

As will be seen from Figure 7, when back-to-back construction is employed, all of the vertical bus bars and the horizontal supply busses 16 are disposed within a single chamber at the rear of, and between, each of the vertical back-to-back groups of units. Again the opposite sides of the group will be closed by the removable plates 6.

It will readily appear that the device of the present invention is a highly flexible, compact and efficient structure for enclosing circuit controlling instrumentalities and the electrical energy carrying components to which they are are attached. It will furthermore appear that this device affords both great safety and ease of maintenance, adequate wiring space being readily accessible by removal of the removable side plates 9 or the upper or lower trim plates, or by removal of the vertical trim sections 29, removal of the latter affording access, as previously indicated, to either power or control wiring, these being isolated on either side of the units 19 and accessible without removal of the units. It is further obvious that insertion or removal of the enclosing boxes containing the circuit controlling instrumentalities is readily effected by sliding these boxes upon the brackets 18.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a supporting structure for electrical circuit controlling instrumentalities, spaced vertical side walls extending rearwardly from the front of said structure and having inwardly extending flanges at the rear thereof, a plurality of vertically spaced brackets mounted by said flanges and extending forwardly thereof, a plurality of vertically disposed conducting means for carrying electrical energy to said instrumentalities, insulating means mounted to said flanges and extending rearwardly thereof for rigidly maintaining said last mentioned means in position, a plurality of circuit control units mounted between said side walls in superimposed relation and rigidly supported from said flanges, said brackets serving to support said units for sliding movement into and out of the space between said side walls when the units are disconnected from said flanges.

2. In a supporting structure for electrical circuit controlling instrumentalities, spaced vertical side walls extending rearwardly from the front of said structure and having inwardly extending flanges at the rear thereof, a plurality of vertically spaced brackets mounted by said flanges and extending forwardly thereof, a plurality of vertically disposed conducting means for carrying electrical energy to said instrumentalities, insulating means mounted to said flanges and extending rearwardly thereof for rigidly maintaining said last mentioned means in position, a plurality of circuit control units mounted between said side walls in superimposed relation and rigidly supported from said flanges, said brackets serving to support said units for sliding movement into and out of the space between said side walls when the units are disconnected from said flanges, and conducting jaws at the backs of said units automatically engageable with said vertical conductors as said units are inserted into position within the supporting structure.

3. In a supporting structure for electrical circuit controlling instrumentalities, spaced vertical side walls extending rearwardly from the front of said structure and having inwardly extending flanges at the rear thereof, a plurality of vertically spaced brackets mounted by said flanges and extending forwardly thereof, a plurality of vertically disposed conducting means for carrying electrical energy to said instrumentalities, insulating means mounted to said flanges and extending rearwardly thereof for rigidly maintaining said last mentioned means in position, a plurality of circuit control units mounted between said side walls in superimposed relation and rigidly supported from said flanges, said brackets serving to support said units for sliding movement into and out of the space between said side walls when the units are disconnected from said flanges, and conducting jaws at the backs of said units automatically engageable with said vertical conductors as said units are inserted into position within the supporting structure, said side walls being spaced apart a distance greater than the width of the units to provide a wiring space at at least one side of said units, and a readily removable trim strip closing the space between the units and the adjacent side wall.

4. In a supporting structure for electrical circuit controlling instrumentalities, vertical sheet metal panels forming side and rear walls, said side walls extending rearwardly from the front of said structure and having openings therein for wiring purposes and also having inwardly projecting flanges at the rear thereof, a plurality of vertically spaced brackets mounted by said flanges and extending forwardly thereof, a plurality of vertically disposed conducting means for carrying electrical energy to said instrumentalities, insulating means mounted to said flanges and extending rearwardly thereof for rigidly maintaining said last mentioned means in position within each of said sections, control units of a width less than the spacing between said side walls supported by said brackets whereby wiring space is provided at the side of said control units, and removable means mounted adjacent the front faces of said control units extending from the units to the adjacent side walls to cover the front entrance to said wiring space.

5. In a supporting structure for electrical control units, spaced sheet metal side walls having inwardly extending flanges adjacent the rear edges, a plurality of spaced brackets mounted upon said flanges for receiving and guiding control units inserted between the side walls into position to be supported from said flanges, mounting means supported on said brackets and extending forwardly thereof to a position adjacent the plane of the front edges of said side walls, and a cover plate on said mounting means covering a blank space in said supporting structure caused by the absence of a control unit whereby to preserve a dead front arrangement for the structure.

6. In a supporting structure for electrical circuit controlling instrumentalities, a plurality of control units containing electrical instrumentalities, a plurality of vertical walls including spaced side walls extending rearwardly from the front of said structure and having inwardly turned flanges at the rear thereof, means for supporting said control units from said flanges, forwardly thereof and between said side walls, electrical conducting means for carrying electrical energy to said instrumentalities, means for supporting said conducting means rearwardly of said flanges, vertically extending angles spaced rearwardly from said flanges, said vertically extending angles being substantially the height of said side walls and aligned therewith, and removable means between said vertically extending angles for preventing rear access to the interior of said structure.

7. In a supporting structure for electrical circuit controlling instrumentalities, a plurality of vertical walls including spaced side walls extending rearwardly from the front of said structure and having inwardly extending flanges at the rear thereof and inwardly offset front ends, a plurality of control units having door portions at the front thereof between said side walls, means for supporting said control units from said flanges, and trim strips longitudinally extending between said side walls and the adjacent edges of said doors, said trim strips having a rearwardly extending flange at one edge thereof positioned exteriorly of said front ends of said side walls, the other edge of said trim strips having an inwardly offset portion substantially parallel to the main portion of said trim strip, said offset portion of said trim strips cooperating with said door portions to close the interior of said structure against access.

8. In a supporting structure for enclosures containing electrical circuit controlling instrumentalities, a plurality of vertical walls including spaced side walls extending rearwardly from the front of said structure and having inwardly directed substantially longitudinal flanges at the rear thereof and inwardly offset front edges, a plurality of enclosures between said side walls having openable front doors, means for rigidly mounting said enclosures to said flanges whereby said enclosures are fixedly mounted within said structure, removable trim strips longitudinally extending between said side walls and said doors, said trim strips having a rearwardly extending flange at one edge thereof positioned exteriorly of said front edges of said side walls whereby a smooth corner is provided, the other edge of said trim strips having an inwardly offset portion substantially parallel to the main portion of said trim strip, said offset portion of said trim strips cooperating with the sides of said door to complete the front closure of said structure.

9. In a supporting structure for enclosures containing electrical circuit controlling instrumentalities, a plurality of vertical walls including spaced side walls having inwardly directed substantially longitudinal flanges at the rear thereof and inwardly offset front edges, a plurality of enclosures between said side walls of box shape having generally pan shaped doors hingedly mounted at the front thereof, means for rigidly supporting said enclosures on said flanges, conducting means for carrying electrical energy to said instrumentalities mounted from said flanges rearwardly of said enclosures, conducting jaws mounted at the rear of said enclosures for engaging said conducting means when said enclosures are in position within said structure, means connecting said jaws to instrumentalities within the enclosures, removable trim strips longitudinally extending between said side walls and said doors, said trim strips having a rearwardly extending flange at one edge thereof positioned exteriorly of said front edges of said side walls whereby a smooth corner is provided, the other edge of said trim strips having an inwardly offset portion substantially parallel to the main portion of said trim strip, said offset portion of said trim strip cooperating with the inwardly directed edges of said door portions to complete the front closure of said structure.

10. In a supporting structure for electrical circuit controlling instrumentalities, a plurality of vertical walls including spaced side walls having internally extending longitudinal flanges at the rear thereof and inwardly offset front edges, a plurality of control units having doors at the front thereof and of a width substantially less than the spacing between said side walls, means mounted to said flanges for mounting said enclosures substantially centrally between said side walls whereby wiring space is provided at either side of said control units, means for rigidly mounting said control units to said brackets, removable trim strips longitudinally extending between said side walls and the adjacent edge of said doors to cover said wiring space, said trim strips having a rearwardly extending flange at one edge thereof positioned exteriorly of said front edges of said side walls, the other edge of said trim strips having an inwardly offset portion substantially parallel to the main portion of said trim strip, said offset portions of said trim strips cooperating with said doors to prevent access to the interior of said structure through the junctures between said strips and said doors, conducting jaws mounted from the rear of said control units, means electrically connecting said jaws to instrumentalities within said units, a plurality of brackets mounted to said flanges and extending rearwardly thereof, insulating means mounted to said brackets, a plurality of vertically extending bus bars engaged by said insulating means, said jaws being positioned to register with said bus bars as said control units are moved into position.

11. In a supporting structure for electrical circuit controlling instrumentalities, a plurality of vertical walls including spaced side walls having inwardly directed flanges and inwardly offset front edges, a plurality of control units between said side walls of box shape and having openable front doors, means mounted to said wall flanges for rigidly supporting said control units whereby said control units are fixedly mounted within said structure, removable trim strips longitudinally extending between said side walls and said doors, said trim strips having a rearwardly extending flange at one edge thereof positioned exteriorly of said front edges of said side walls whereby a smooth corner is provided, the other edges of said trim strips having an inwardly offset portion substantially parallel to the main portion of said trim strip, said offset portion of said trim strip cooperating with the side edges of said doors to complete the front closure, conducting jaws mounted from the rear of said control units, a plurality of insulating means mounted from said flanges and extending rearwardly thereof, a plurality of vertically extending bus bars engaged by said insulating means, said jaws being positioned to register with said bus bars as said enclosures are moved into mounted position, vertical angles of substantially the height of said side walls and aligned therewith spaced rearwardly from said flanges, and sheet metal walls mounted on said angles and extending therebetween to prevent access into the structure from the rear.

12. In a supporting structure for electrical circuit controlling instrumentalities, a plurality of vertical sections mounted together in side by side relation so as to form a control center, a plurality of control units mounted within said vertical sections, an opening extending horizontally through said sections, a plurality of bus bars extending horizontally through said opening for feeding electrical energy to said control units, means for supporting said bus bars in position, comprising a plurality of pairs of vertically spaced supports carried by said sections, opposed brackets mounted upon each of said pairs of supports, a pair of rods extending between said opposed brackets, a plurality of insulating elements freely movable upon said rods, bus bars mounted between said insulating elements, and means for clamping said insulating elements and bus bars together and to said opposed brackets.

13. In a supporting structure for electrical circuit controlling instrumentalities, a plurality of vertical sections mounted together in side by side relation so as to form a control center, a plurality of control units mounted within said vertical sections, an opening extending horizontally through said sections, a plurality of bus bars extending horizontally through said opening for feeding electrical energy to said control units, means for supporting said bus bars in position, comprising a plurality of pairs of vertically spaced supports carried by said sections, opposed brackets mounted upon each of said pairs of supports, a pair of metallic rods extending between said opposed brackets, insulating sleeves about said rods, insulators slidably mounted upon said sleeves, bus bars mounted between said insulators and interiorly of said sleeves, and means for clamping said insulators and bus bars together and to said brackets.

14. In a supporting structure for electrical circuit controlling instrumentalities, a plurality of vertical sections mounted together in side by side relation so as to form a control unit, a plurality of control units mounted within said vertical sections, an opening extending horizontally through said sections, a plurality of bus bars extending horizontally through said opening for feeding electrical energy to said control units, means for supporting said bus bars in position, comprising a plurality of pairs of vertically spaced supports carried by said sections, opposed brackets mounted upon each of said pairs of supports, a plurality of insulators and bus bars mounted between said brackets in alternate superimposed relation with the top and bottom elements constituting insulators, and means for clamping said insulators and bus bars together and to said brackets.

EARL F. MEKELBURG.

References Cited in the file of this patent

UNITED STATES PATENTS

| Number | Name | Date |
|---|---|---|
| 1,379,767 | Krantz | May 31, 1921 |
| 1,930,028 | Adam | Oct. 10, 1933 |
| 2,132,630 | Jackson | Oct. 11, 1938 |
| 2,147,023 | Frank | Feb. 14, 1939 |
| 2,319,415 | Lightfoot | May 18, 1943 |
| 2,343,178 | Frank et al. | Feb. 29, 1944 |
| 2,359,247 | Rowe | Sept. 26, 1944 |